United States Patent Office 3,105,575
Patented Oct. 1, 1963

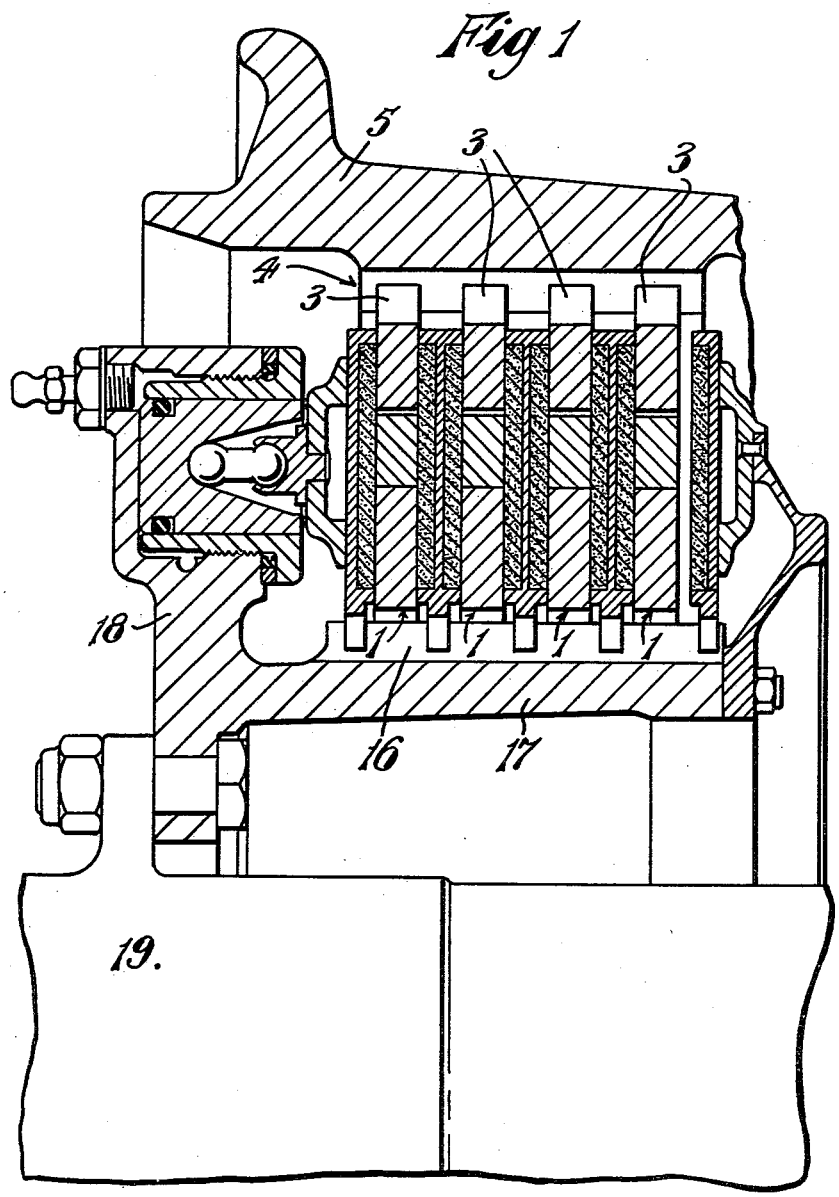

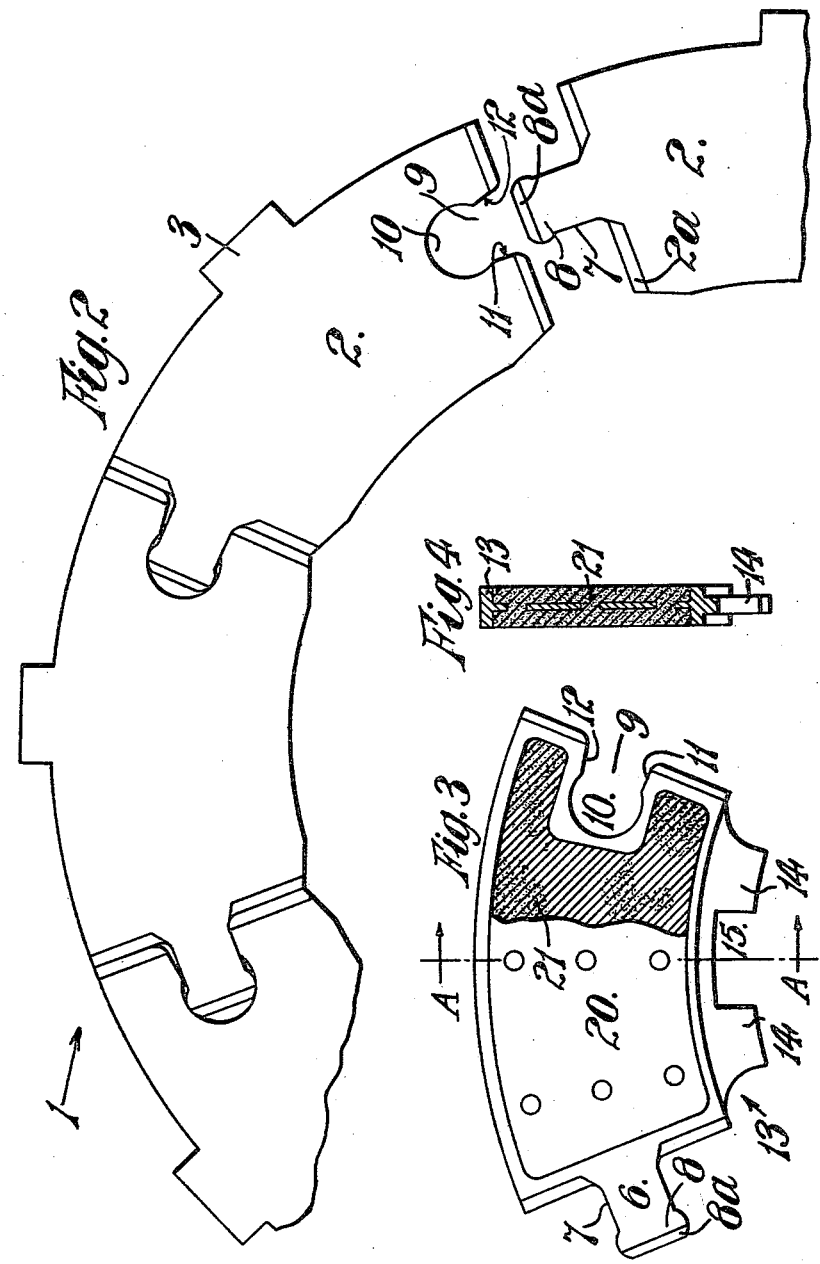

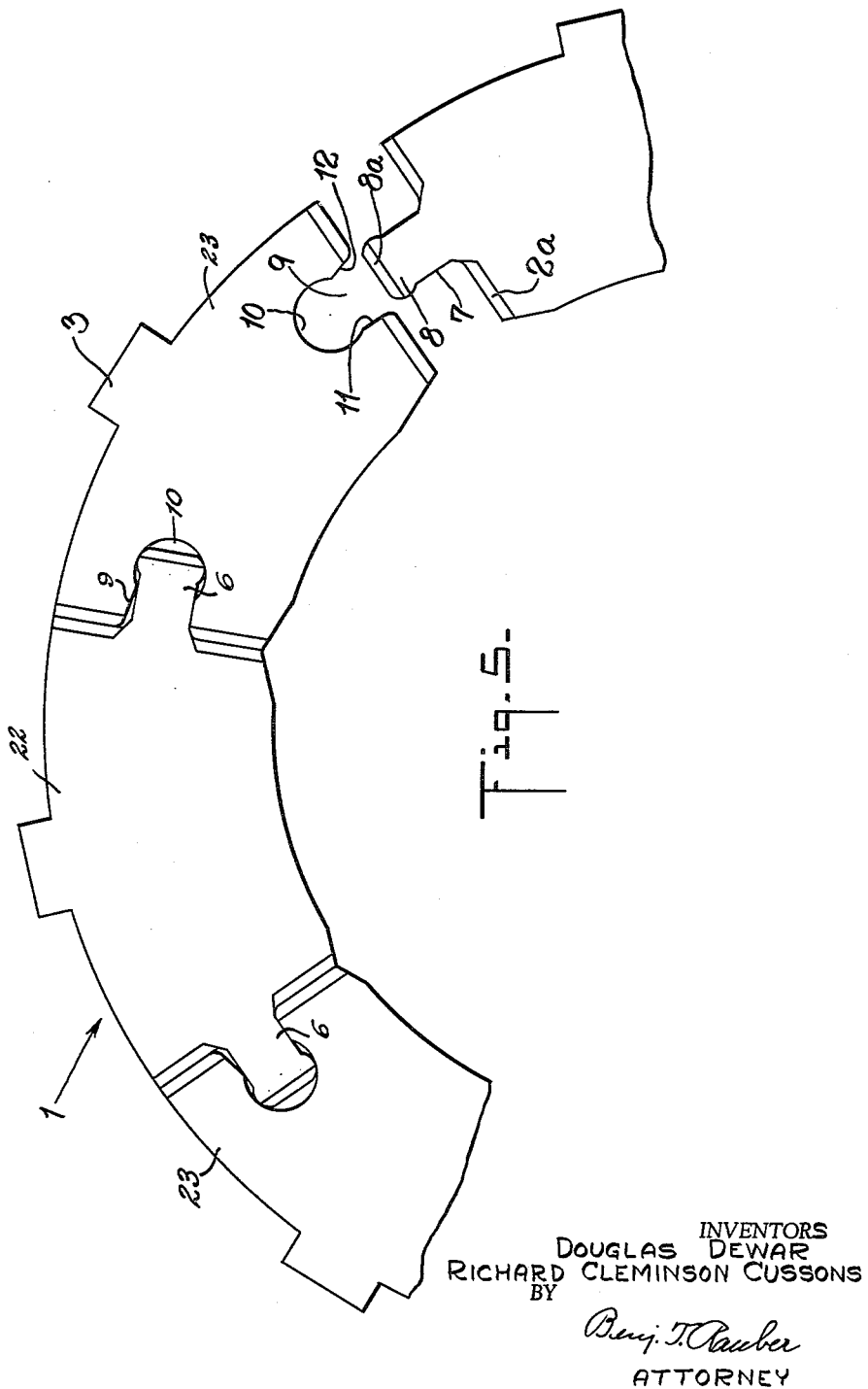

3,105,575
IMPROVEMENTS IN BRAKE DISCS
Douglas Dewar, Wolston, near Coventry, and Richard Cleminson Cussons, South Cerney, Cirencester, England, assignors to Dunlop Rubber Company Limited, London County, England, a company of Great Britain
Filed Nov. 16, 1959, Ser. No. 853,154
Claims priority, application Great Britain Nov. 20, 1958
6 Claims. (Cl. 188—218)

This invention relates to disc brakes and more particularly relates to a disc for incorporation in a disc brake.

Annular brake discs are known comprising a plurality of ring segments each provided with abutting radially-extending or substantially radially-extending edges, one said edge of each segment being provided integrally with a co-planar extension or head and the other said edge being provided with a recess to form a loose fitting joint whereby said segments are held in annular form.

The object of this invention is to provide an improved disc of this type.

According to the present invention an annular brake disc comprises a plurality of ring segments each provided with abutting radially-extending or substantially radially-extending edges, one said edge of each segment being provided integrally with a coplanar extension comprising a head and a neck having a pair of parallel sides normal to a radius of said disc and the abutting edge of an adjacent segment being provided with a recess to receive said head and a guide for said neck whereby said segments are maintained in concentric relationship and are capable of a predetermined amount of relative separation in a direction parallel to a tangent of the disc.

Preferably the said extensions comprise substantially-rounded heads joined to the segments by necks of reduced width so that, when these are joined together to form an annular disc they are completely separable only by axial sliding of one segment relative to an adjacent one. Driving means, which may comprise radially-outwardly-extending dogs or alternatively may comprise slots, may be provided on or in the outer peripheral edge of each segment whereby, when the disc is employed as a rotor, each segment is individually driven by and axially-slidable relative to a wheel. The disc may alternatively be used as a stator in which case the inner peripheral edge may be provided with dogs or slots whereby it is slidably secured to the non-rotatable torque-tube of the brake assembly.

The invention will now be described with reference to the accompanying drawings of which:

FIGURE 1 is a cross-section of a half of an aircraft wheel having annular brake discs of the multiple segment type, FIGURE 2 is an elevation of a rotor brake disc partly assembled from a number of segments and with one segment not connected, FIGURE 3 is a partly sectioned elevation of a single stator segment, FIGURE 4 is a section on A—A of FIGURE 3 of a stator segment.

FIG. 5 is a view similar to FIG. 1 of a modification.

A rotor brake disc 1 for an aircraft comprises eight identical segments 2 each having an inner and outer peripheral arcuate edge and opposite radially-outward ends. Each segment 2 is provided centrally on its outer peripheral edge with a rectangular driving dog 3 to make sliding engagement in corresponding keyways 4 in a wheel rim 5.

Each segment 2 is also provided centrally of one of its radially-extending ends with a co-planar extension 6 comprising a neck 7 having parallel sides and a substantially-rounded head 8 having a radial width greater than that of the neck 7. The sides of the neck 7 are normal to a radius of said segment 2. The radially-extending end of the segment 2 proper and the radially-extending extreme end of the head have chamfers 2a and 8a respectively so that, as the disc 1 articulates in service, there will be no projecting portions to cut the co-operating friction members of the brake.

The other radially-extending end is similarly chamfered and is provided centrally with a channel 9 leading into a part-circular recess 10 (shown in FIGURES 2 and 3). The inner wall 11 of the channel 9 is normal to a radius of the segment 2. The radially outer wall 12 is tapered radially-outwardly from the part-circular recess 10 and thereby prevents the neck 7 from binding on the channel 9 due to localised heat effects caused by the differential in linear speed between the outer periphery of the disc 1 and the inner. The length of each neck 7 i.e. in a direction parallel to a tangent of the segment 2, is slightly longer than the channel 9 so that, when the segments 2 are fitted together to form a complete disc 1 a predetermined amount of relative separation, in a direction parallel to said tangent, is possible.

The eight segments 2 are fitted together by engaging, in an axial direction, the extension 6 of one segment 2 in the recess 10 of an adjacent one so that when fitted together they constitute an annular disc 1. The overall diameter of the disc 1 may be contracted before assembly to a wheel, until the extreme end of each head 8 abuts the part-circular recess 10 and in this condition the abutting radially-extending ends of the segments 2 are either just touching or spaced only a very short distance apart.

The description so far has referred to a rotor brake disc 1. A stator brake disc (not shown), i.e. a brake disc secured against rotary movement, is similar to the rotor brake disc 1 so far as the interconnection of the separate segments is concerned but is different in certain other respects. Each segment 13 (see FIGURE 3) of the stator brake disc is provided at the mid point of its inner peripheral edge with a flat projection 14 in which is formed a recess 15 to engage a spline 16 on an annular flange 17 projecting axially from a torque member 18 secured to a non-rotatable part 19 of the aircraft.

The two part-annular faces 20 of each stator segment 13 have pads 21 of friction material associated with them. The pads 21 may be of non-metallic friction material bonded with a suitable metallic powder, pressed and sintered into recesses in the segment as shown in FIGURE 4 or may be pressed into and sintered in shallow cup-like members which may then be secured to the segment e.g. by rivetting or welding, alternatively, outline holders secured to or integral with the segment, may be used to retain the pad.

The friction pads, cup members, outline holders and the segment itself may be made of sintered materials having the properties required by these components when in service.

As the wheel rotates the rotor disc 1 is increased in overall diameter, due to the action of centrifugal force on each segment 2 whereby said segment is moved tangentially away from its neighboring segment 2. Excessive relative movement is prevented by the head 8 on each extension 6 abutting the end of the channel 9 in the neighboring segment 2 in which it is located. The guide formed by the neck 7 and channel 9 prevents tilting of one segment 2 relative to another and maintains concentricity of said segments.

In service both the rotor and stator discs are articulated so that the segments of each can expand, due to the effects of heat, without affecting its neighbor, and thus warping and distortion of either disc as a whole is prevented.

In the modification shown in FIG. 5 alternate segments 22 have extensions 6 from each of the two radial edges shown in FIG. 2 and each of the two radial edges of alternate second segments 23 have a channel 9 and part circular recess 10 shown in FIG. 2 positioned to receive the extensions of the first segments. The extensions and the channels and recesses being of the same construction as those of FIG. 2 are designated with the same reference characters.

As the wheel rotates, the rotor disc 1 is increased in overall diameter due to the action of centrifugal force on the segments 22, 23 whereby each segment is moved tangentially away from its neighboring segment.

Having now described our invention, what we claim is:

1. An annular brake disc comprising a plurality of ring segments, each segment having plane side faces and radially extending edges, each radial edge of one segment abutting a radial edge of an adjacent segment to form a flat annular disc, said segments having interlocking engagements at said radial edges each said interlocking engagement comprising a co-planar extension from a first segment having a neck portion with parallel edges extending from and normal to a radial edge of said segment and a head at the free end of said neck portion of a diameter in a radial direction greater than the width of said neck portion and a recess extending from a second segment comprising a passage positioned to receive the neck portion of the first segment and having a radial edge in sliding contact with one radial edge of the neck portion of said first segment and an opposite edge in contact with the opposite edge of said neck portion adjacent said head and diverging therefrom to said radial edge of said second segment, said recess being enlarged at the end of said passage to receive said head and to permit limited movement of said head and neck portions of said first segment in a direction normal to said abutting radial edges of said segments.

2. The brake disc of claim 1 in which each segment has an extension from one radial edge and a recess from the opposite radial edge.

3. The brake disc of claim 1 in which the head of the extension is rounded and the enlarged portion of said recess is rounded adjacent said passage to contact the rounded portion of said head.

4. The brake disc of claim 1 in which the radially extending edges of the segments and the end portion of said head are chamfered.

5. The brake disc of claim 1 in which the flat portions of said segments comprise friction material.

6. The brake disc of claim 1 in which alternate first segments of said disc have an extension from each radial edge and alternate second segments have a recess at each radial edge to receive an extension from a first segment.

References Cited in the file of this patent

UNITED STATES PATENTS

| 1,919,168 | Perks | July 18, 1933 |
| 2,144,831 | Burns | Jan. 24, 1939 |
| 2,237,624 | Oldham | Apr. 8, 1941 |
| 2,423,882 | Frank | July 15, 1947 |
| 2,714,269 | Charles | Aug. 2, 1955 |
| 2,778,470 | Goldberg | Jan. 22, 1957 |